United States Patent [19]
Maier et al.

[11] Patent Number: 4,665,617
[45] Date of Patent: May 19, 1987

[54] COMPASS SAW FOR CUTTING WORKPIECES OF WOOD, PLASTICS AND METAL

[76] Inventors: Peter Maier, Gerokstrasse 1, 7311 Neidlingen; Gernot Hänsel, Gerstenstrasse 31, 7000 Stuttgart 70; Rolf Henzler, Filsstrasse 7, 7440 Nürtingen; Hartmut Walter, Im Sämann 71, 7050 Waiblingen; Günter Arnold, Albstrasse 5, 7441 Kohlberg, all of Fed. Rep. of Germany

[21] Appl. No.: 738,680

[22] Filed: May 28, 1985

[30] Foreign Application Priority Data

Jun. 1, 1984 [DE] Fed. Rep. of Germany ....... 3420442

[51] Int. Cl.⁴ .................. B27B 11/02; B27B 19/09
[52] U.S. Cl. .................................... 30/374; 30/392
[58] Field of Search .............. 30/123.3, 392, 393, 30/394, 374, 124, 376; 51/273

[56] References Cited

U.S. PATENT DOCUMENTS

| | | | |
|---|---|---|---|
| 2,996,089 | 8/1961 | McCarty | 30/374 |
| 3,033,252 | 5/1962 | Atkinson | 30/392 |
| 3,303,861 | 2/1967 | Kane | 30/374 |
| 3,938,251 | 2/1976 | Kareman | 30/376 |
| 4,090,297 | 5/1978 | Wanner | 30/374 |
| 4,195,403 | 4/1980 | Gruber | 30/392 |
| 4,334,356 | 6/1982 | Krosunger | 30/374 |

*Primary Examiner*—Jimmy C. Peters
*Attorney, Agent, or Firm*—McGlew and Tuttle

[57] ABSTRACT

A compass saw comprises a drive unit for a saw blade holder carrying a saw blade, and a base plate supporting the drive unit. The base plate has on its underside a glide shoe lined on a bottom face with a contact sole. The guide shoe is provided to guide the blade at the level of the base plate, more particularly close above the contact sole, laterally to an extract such as to prevent it from deviating from the desired course, as well from canting and coming into off position.

3 Claims, 14 Drawing Figures

COMPASS SAW FOR CUTTING WORKPIECES OF WOOD, PLASTICS AND METAL

FIELD AND BACKGROUND OF THE INVENTION

This invention relates in general to cutting and sawing devices and in particular to a new and useful compass saw for cutting workpieces.

It is known to equip hand tools, such as compass saws of the above mentioned kind, with a dust exhauster (German OS 25 46 527). In prior art designs, however, the exhauster equipment is detachaby connected to the base plate, so that gaps are formed strongly reducing the efficiency. Aside therefrom, expeience has shown that, as is the case with any tools having detachable parts, the additional parts once removed will never be attached again, if only out of simple self indulgence, so that the effect is lost. The motor head cannot be tilted in this prior art design, so that bevel cuts cannot be made. Another tilting head is known from U.S. Pat. No. 3,958,251, in which, however, no exhaustion is provided.

SUMMARY OF THE INVENTION

The present invention is directed to a saw of the above mentioned kind in which the exhaustion is improved and at the same time a steady guidance of the motor head is ensured also in tilted position.

In accordance with the invention, a compass saw includes a base plate which comprises a hollow section fixture having a dust exhaust duct therein extending in a longitudinal direction and opening close behind the back of the saw blade adjacent the upper side of the base plate and it includes an exhaust connection to which an exhaust line is connectable. The fixture is interval with the base plate and the exhaust connection includes an upwardly arched upper wall having a circularly cylindrical outer surface which defines a guide surface. The motor head has a counter guide surface and this is engaged on the guide surface so that the motor head is tiltably mounted thereon.

This means that the invention provides to utlize the semicylindrical fixture forming the exhaust duct at the same time as a support for the motor head which is seated thereon for tilting, thus to give this fixture a double function permitting to save special exhaust parts and, because of the centric disposition of the exhaust duct on the base plate, to minimize the length of the flow path and eliminate dead volumina. Along with making the fixture integral with the base plate and the exhaust connection, this leads to a most efficient exhaustion. Also, the entire arrangement becomes very simple in construction and manufacture.

The exhaust connection havng an oval cross section forms a particularly advantageous transition between the semicylindrical inside cross section of the fixture and a usual flexible tube. The cross sectional area of passage is constant over the entire length of the exhaust duct. Further, more space is thereby given to a manual engaging of the bar motor (drive unit) from below and around.

According to one embodiment, a slide is provided which covers an opening in the base plate preventing the suction effect. In a particularly inexpensive way, the slide is captured between the foot plate and the glide shoe detachably secured thereto, and guided on either or both of these parts.

In accordance with the invention, applicant has provided a compass saw which includes a motor head which is pivotally mounted on a base plate over an exhaust duction construction which has an upwardly arched wall forming a curved base upon which the motor head is tiltable.

A further object of the invention is to provide a compass saw having a base plate with an exhaust duct thereon defining a curved surface guide on which the motor head for the saw is tiltable.

A further object of the invention is to provide a compass saw which is simple in design, rugged in construction and economical to manufacture.

The various features of the novelty which characterize the invention are pointed out with particularity in the claims annexed to and forming a part of this disclosure. For a better understanding of the invention, its operating advantages and specific objects attained by its uses, reference is made to the acompanying drawings and descriptive matter in which preferred embodiments of the inention are illustrated.

DESCRIPTION OF THE PREFERRED EMBODIMENTS

Referring to the drawings in particular, the invention embodied therein comprises a compass saw for cutting workpiece of wood, plastics, metal, etc. and it includes a housing or head portion 2 which carries a drive unit 3 for reciprocating the saw blade holder 4 along with a blade 5. In accordance with the invention, the face blade generally designated 1 carries the housing 2 with the drive unit 3 and includes on its underside a guide plate 11 which has a bottom contact sole 6 which rides over the workpiece. Means are disposed at the level of the base plate 1 particularly close above the contact sole 6 which is adjacent the path of the movement of the blade 9 providing a guide for the blade preventing the blade from canting from its set angle and direction of movement.

Figure 1:
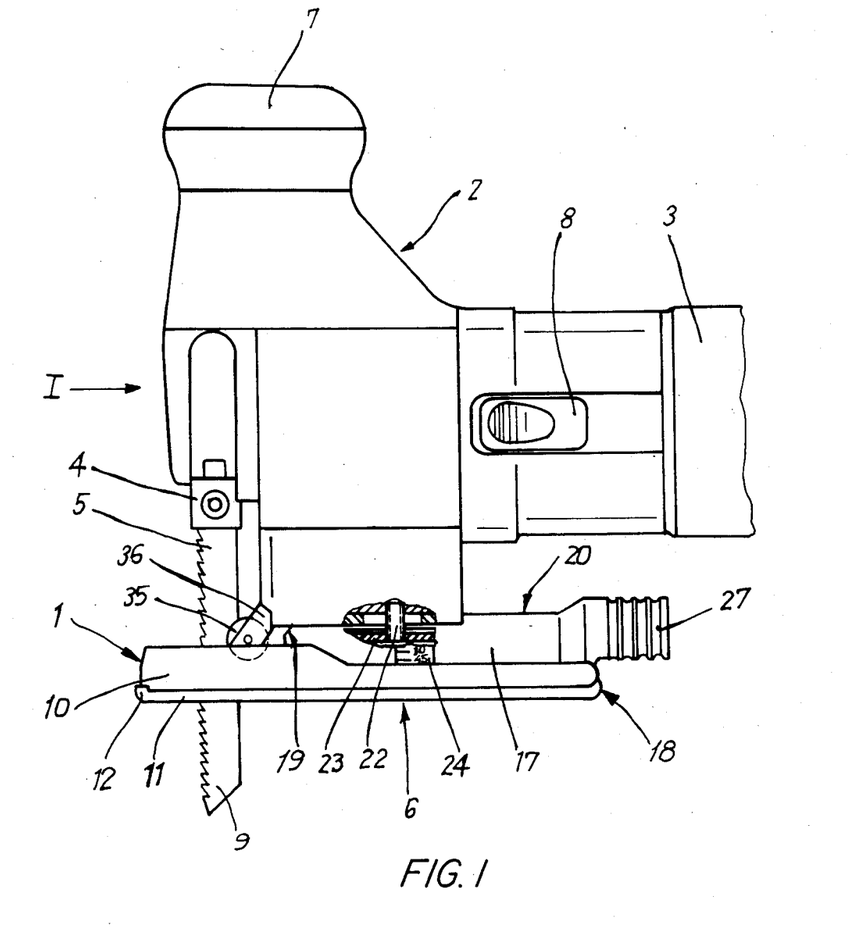
FIG. 1 is a partly sectional side and elevational view of a compass saw constructed in accordance with the invention.
Figure 2:
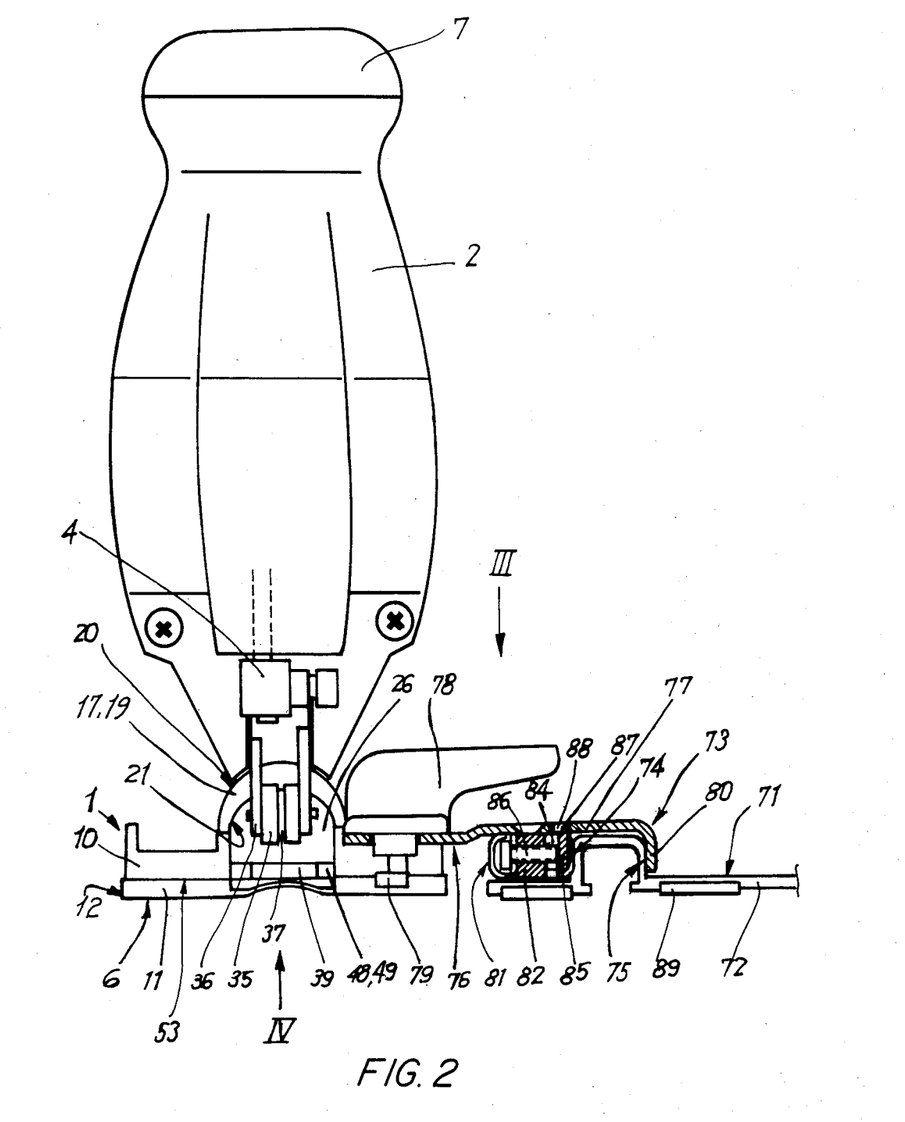
FIG. 2 is a partial front elevational and sectional view of the saw taken in the direction I of FIG. 1, with an intermediate piece forming a connection to a guide plate which can be placed on the workpiece.

Referring first to FIGS. 1 and 2, the mechanically driven hand-operated compass saw shown therein comprises a base plate 1 supporting a motor head (drive motor and Transmission), 2, and a drive unit 3 (bar motor). Drive unit 3 drives a saw blade holder 4 in a reciprocating up and down movement. In blade holder 4, a downwardly projecting saw blade 5 can be clamped which extends through an aperture in base plate 1 to protrude beyond a contact sole 6 of base plate 1. In operation, the compass saw is usually placed by its base plate 1 on the workpiece to be sawed. Then, the operator hold the saw by one of his hands by engaging the motor head 2 which has its upper portion formed as a knob 7, while the operator's other hand holds the housing of the drive unit 3 on which also a switch 8 is provide, for switching unit 3 on and off, and for controllng the speed of the unit. The saw is guided over the workpiece along a desired cutting line which is sawed by the downwardly protruding end portion 9 of saw blade 5.

The base plate is built up of two parts, namely a foot plate or shoe 10 and a glide shoe 11 which is detachably connected thereto and covers the underside of plate 10 while projecting on all sides above the periphery thereof. Foot plate 10 is metallic, particularly of a light metal such as die-cast aluminum. Glide shoe 11 is a plate of plastic having an upwardly protruding peripheral rim 12. Upon being inserted in glide shoe 11, foot plate 10 is held by rim 12 positively in place. The detachable connection between foot plate 10 and guide shoe 11 may be established by screws, for example.

This build up of base plate 1 has various advantages. The metallic foot plate 10 gives the base plate the desired stiffness which may still be augmented by providing suitable reinforcing ribs or making the plate thicker or by other design. Reinforcing ribs of any shape may be formed integrally with plate 10 in an inexpensive die-casting process. The glide shoe 11 made of plastic, particularly a thermoplastic material, ensures a low-friction contact between the saw and the workpiece. Sensitive workpiece surfaces are saved from scratches and lateral impacts since shoe 11 protrudes above plate 10 on all sides. Shoe 11 also attenuates to a certain extent vibrations and shocks. The elasticity of base plate 1 may further be increased by providing a resilient intermediate layer such as rubber (not shown). This layer may be clamped fast to obtain a sealing effect which is wanted as will be explained hereinafter.

Figure 4:
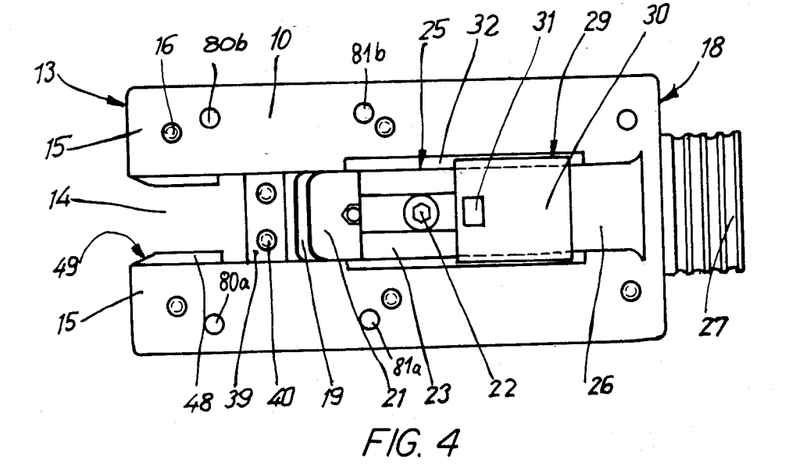
FIG. 4 is a bottom plan view of the base plate of the saw, taken in the direction IV of FIG. 2, with the glide shoe, the stabilizing elements, and the chip guard being omitted, and the slide being an open position.

As shown in FIG. 4 in a bottom view, base plate 1 is a rectangular frame structure having a central clearance 14 open to one of the narrow sides 13, which gives the frame a U-shaped configuration with two legs 15. The saw blade 5 (not shown in this view) extends through clearance 14 at the left hand side. Both the foot plate 10 and the glide shoe 11, of course, have the same configuration. Tapholes for the screw connection between 10 and shoe 11 are shown at 16.

Referring back to FIGS. 1 and 2, foot plate 10 carries an oblong fixture 17 firmly secured thereto and having an arched hollow section. Fixture 17 may be made integral with plate 10, particularly in a die-casting process, and is disposed centrally on top of base plate 1 while extending in the lengthwise direction from the narrow rear side 18 thereof substantially to the clearance 14. The front edge of the fixture 17 is indicated at 19. The fixture 17 is arched upwardly, as shown in FIG. 2. It upper surface 20 is circularly cylindrical over an angular extension of about 180°, in the present embodiment, which gives the entire fixture the configuration of a semicylinder.

Motor head 2 is supported by the fixture 17 for resing thereon upright or in positions of various inclinations. For this purpose, the underside 21 of motor head 2 is cylindrically concave, conformable to the cylindrical surface of the fixture, only the angle of the fitting cylindrical surface is substantially smaller than that of the fixture, to allow for tilting. In mounted state, motor head 2 rests firmly on fixture 17 and is secured in the desired position by means of a clamping screw 22.

The arrangement of clamping screw 22 is shown in the cutaway portion of FIG. 1. Clamping screw 22 has its head within the cavity of fixture 17, extends upwardly through an oblong slot 62 (see FIG. 6) provided in the cylindrical wall of the fixture, and is screwed from below into a taphole provided in the base of motor head 2. The head of clamping screw applies against the inside of fixture 17 directly or through a suitable washer 23. Upon tightening clamping screw 22, motor head 2 is clamped against fixture 17. In the motor head position shown in FIGS. 1 and 2, saw blade 5 extends perpendicularly to the plane of the base plate. Clamping screw 22 therefore extends vertically upwardly, and the cut of the saw will also be vertical. To obtain a cut inclined toward the vertical, upon loosening clamping screw 22, motor head 2 along with the blade holder 4 and saw blade 5 are brought on fixture 17 into the desired tilted position. Clamping screw 22 is loosened by means of a tool introduced through an opening 25 in base plate 1. During the tilting of motor head 2 (i.e. of the drive motor and the transmission), screw 22 changes its angular position within the slot 62 which in fact is a cross slot. The angle of inclination can be read on a scale 24. In the shown embodiment, motor head 2 can be tilted to either side through 45°.

In accordance with the invention, fixture 17 is also employed for dust removal from the cutting area. The inside of fixture 17 forms an exhaust duct having its intake opening on the top of the base plate close behind the back of saw blade 5. The outlet opening at the opposite side of the exhaust duct is formed by an exhaust connection 27 to which an exhaust line, such as a flexible tube, may be connected. Connection 27 is an axial extension of fixture 17 which is slightly offset upwardly. Advantageously, connection 27 is produced integrally with fixture 17 and foot plate 10, in an inexpensive die-casting process. Connection 27 protrudes behond the narrow rear side of base plate 1 and is ribbed to retain the connected line. The cross section of connection 27 should be wide enough to correspond at least to the width of exhaust duct 26 formed by the cavity of fixture 17. It is therefore advisable to make connection 27 elliptic or oval, with the width being the larger dimension (see FIGS. 1 and 4). This eliminates a narrowing of the flow passage and shortens the flow path. The resistance to flow is correspondingly low and the dust is removed with a high efficiency. An elliptic shape also enlarges the clearance needed by the operator to take hold of the motor from below.

Figure 5:
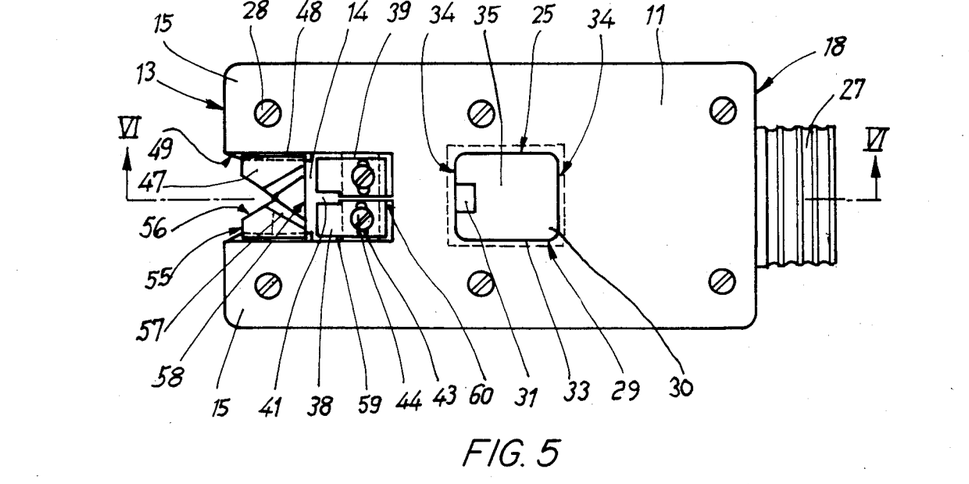
FIG. 5 is a view corresponding to FIG. 4, taken after mounting the contact sole, the stabilizing elements, and the chip guard, with the slide in closed position.

As shown in FIG. 4, in the zone of exhaust duct 26, foot plate 10 is downwardly open, only covered by glide shoe 11 secured thereto with screws 28 (see FIG. 5). Glide shoe 11 can thus be removed in a simple way to clean duct 26. Further, after the glide shoe made of plastic wears down, it can easily be exchanged. Foot plate 10 and glide shoe 11 fit each other superficially, which, under normal conditions, ensures a satisfactory sealing of duct 26. An elastic intermediate layer as mentioned above, might improve both the sealing and the properties of base plate 1.

The oblong slot 62 through which the clamping screw 22 for arresting motor head 2 extends, is enclosed by washer 23 and/or the base of motor head 2, so that air cannot infiltrate therethrough into duct 26. In accordance with the invention, opening 25 through which clamping screw 22 is accessible from below is closable with a slide 29. Slide 29 is shown in FIG. 4 in its open position, in FIG. 5 in its closed position.

Figure 6:
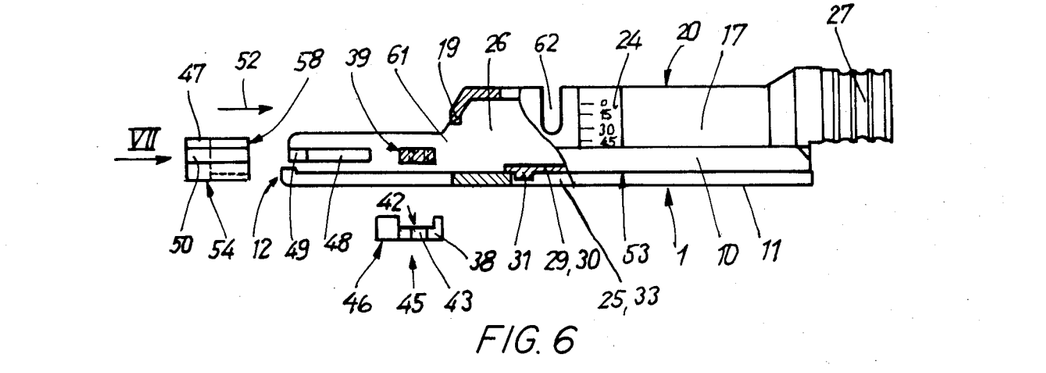
FIG. 6 is a sectional view taken along the line VI—VI of FIG. 5, with the stabilizing elements and the splinter or chip guard omitted.

Slide 29 comprises a plate 50 which is provided with a downwardly protruding button 31. Plate 30 is guided for length-wise displacement on foot plate 10. For this purpose, grooves 32 are provided on both sides of duct 26 forming a stepped enlargement of the duct. While received in these grooves 32, plate 30 is submerged relative to the surface of foot plate 10. In longitudinal direction of base plate 1, grooves 32 exceed the length of slide plate 30, so that the slide is displaceable. With glide shoe 11 secured in place (see FIG. 5), slide plate 30 is captivated between foot plate 10 and glide shoe 11. Glide shoe 11 covers the major part of exhaust duct 26, including grooves 32. Glide shoe 11 is provided with an aperture 33 which is aligned with aperture 25 of foot plate 10, yet is smaller in size than slide plate 30. In one end position of slide 29, aperture 33 is open so that the head of clamping screw 22 is accessible, in the other end position, the aperture is entirely closed (see FIG. 5). The end positions may be determined by the ends of grooves 32 forming stops for the slide. It is also possible to use the button 31 of the slide as a stop butting against the edge 34 of aperture 33. As shown in FIG. 6, the height of button 31 does not exceed the thickness of guide shoe 11, so that slide 29 is completely submerged below contact sole 6 of base plate 1.

To obtain a straight cut, sole plate 11 is laterally backed up and stabilized in more than one way, in accordance with the invention. FIGS. 1 and 2 show a guide and pressure roller 35 applying against the back of blade 5. In FIG. 2, the blade is not shown to simplify the drawing. Roller 35 is spaced from the base plate 11 1 upwardly. It is mounted on supports 36 which are connected to the motor head 2. More particularly, the supports 36 may be hinged to motor head 2 and biased by a compression spring (not shown) urging the roller against blade 5. Roller 35 itself is mounted on supports 36 for rotation and provided with a central circumferential groove 37 corresponding in width to the thickness of saw blade 5, with a little allowance for play. The back of blade 5 engages roller groove 37, so that the blade is laterally stabilized. Roller 35 turns in accordance with the up and down movements of blade 5 and is mounted to also follow a swinging motion of the blade. The primary function of roller 35 is that of an abutment preventing the blade during operation from yielding rearwardly or laterally. In this regard, the lateral stabilization by roller 35 is not completely satisfactory, in view of the mounting above contact sole 6.

The invention therefore provides an additional lateral guidance of saw blade 5 at the level of base plate 1, directly above contact sole 6. As shown in FIGS. 4–6, this is achieved by means of two stabilizing elements 38 producing their effect against the two flanks of blade 5. Stabilizing elements 38 are small blocks of thermally highly resistant material, particularly oxide ceramic, such as aluminum oxide ceramic material. These blocks may be positioned against blade 5 in most various ways to prevent the blade from bending at the exit side of the cut and from deflecting or diverting laterally.

In the embodiment of FIGS. 4 to 6, stabilizing elements 38 are screwed to the foot plate 10. Integrally formed with the foot plate 10 is a bridge 39 across the clearance 14 through which the blade passes. Bridge 39 extends behind the back of saw blade 5. The bridge has a rectangular, rounded cross section and is provided with two tapholes 40 disposed symmetrically at both sides of the longitudinal central plane of foot plate 10, and extending perpendicularly to the base plate plane. Tapholes 40 serve to secure the stabilizing elements 38 which are substantially rectangular in a plan view (see FIG. 5) and recessed on their side facing each other, so that a passage gap 41 for saw blade 5 is formed. This gap 41 is preferably made only so deep as to allow the stabilizing elements to apply against the toothless part of blade 5, not against the cutting edges.

In a side view, FIG. 6, the stabilizing elements 38 are U-shaped. They fit by the open side of their U the bridge 39 and are screwed thereto from below. It is possible to adjust their position in the plane of the base plate, transversely to the cutting direction of blade 5. The stabilizing elements 38 are provided with corresponding oblong slots 43 through which the mounting screws 44 are passed. In the oblong slots, they can be displaced to compensate for tolerances and unequal blade thicknesses and to adjust the play of blade 5 between the stabilizing elements.

In the zone of stabilizing elements 38, glide shoe 11 is cut out to an extent corresponding to clearance 14 of foot plate 10. The stabilizing elements are thus accessible from the underside of base plate 1 even with the glide shoe 11 in place. Arrow 45 in FIG. 6 indicates how stabilizing elements 38 are engaged on bridge 39. It will be understood that in mounted position, the stabilizing elements protrude below the underside of foot plate 10, but remain submerged in glide shoe 11. This ensures a minimum clearance between the plane of contact sole 6 and the lower edge 46 of stabilizing elements 38.

In accordance with the invention, a splinter or chip guard 47 is provided in front of stabilizing elements 38, through which the cutting edges of blade 5 are moved. Chip guard 47 is made of a soft material, particularly plastic, into which the saw blade 5 cuts in to produce a runnng gap. For this purpose, the splinter guard must be pushed, for example, by the operator's thumb, against the running blade. Chip guard 37 is supported by the foot plate 10 in which the saw blade reciprocates, and is adjustable in the longitudinal direction of base plate 1.

To provide a guidance for the chip guard 47, two ribs are formed integrally with the foot plate 10 on opposite sides of clearance 14, as shown in FIGS. 2,4,6. Ribs 48 have a substantially rectangular cross section and extend from the narrow front side 13 of foot plate 10, where slanting portions 49 are provided to facilitate the introduction of the guard, parallel to the base plate plane, almost up to the bridge 39.

Figure 7:
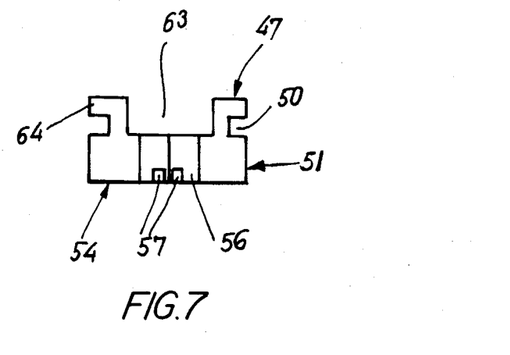
FIG. 7 is an enlarged front view of the chip guard, taken in the direction VII of FIG. 6.

Ribs 48 engage matching guide grooves 50 which are provided on both sides 51 of the chip guard 47 (see FIGS. 6 and 7). The chip guard 7 can be displaced on ribs 48 until it butts against stabilizing elements 38, during which motion blade 5 saws a running gap into the guard 47. The direction in which chip guard 47 is introduced is indicated by arrow 52 in FIG. 6. It may be understood from the showing that in mounted state, chip guard 47 protrudes below bottom side 43 of foot plate 10 but remains submerged in glide shoe 11, so that its underside 54 comes to extend flush with contact sole 6 of slightly thereabove. In this arrangement, the soft material of guard 47 prevents portions of the workpiece from splintering off at the exit of blade 5, so that a very neat cut is obtained with minimum waste.

The chip control is very important, to be able to adjust a small play between stabilizing elements 38 and saw blade 5. As far as possible, the chips must be prevented from penetrating between blade 5 and the stabilizing elements 38, where they would brake the blade and increase the wear. This is assisted, in accordance with the invention, by a cross section of the chip guard and the efficient dust removal. Referring to FIGS. 5-7, a centric triangular notch 56 is provided in the front edge 55 of chip guard 47 having its apex corner pointing in the direction of the blade to serve during the sawing operation as an indicator of the cut or the blade position, and thus facilitate the exact guidance of the saw along a marking. Laterally of the apex line of the notch, two chip chutes 57 are provided in the underside 54 of guard 47 (see FIGS. 5 and 7).

The chip chutes 57 divert relative to each other toward the rear side 58 of the guard 47 to terminate at the side edges thereof. The chip amount already small in itself at the underside of base plate 1 is thus removed laterally of stabilizing elements 38. The stabilizing elements 38 are dimensioned to occupy neither the full width nor the full depth of clearance 14 of base plate 1. Therefore, gaps 59 and 60 remain at the sides and the rear, respectively, of the stabilizing elements, through which the exhaust air entraining the waste can pass through the underside of base plate 1. The chips are thus efficiently removed.

FIG. 6 clearly shows the front edge 19 of fixture 17 and the intake 61 of exhaust duct 26. Also shown is the oblong slot 62 through which clamping screw 22 for arresting motor head 2 in position extends. In the shown example, stabilizing elements 38 are fixed to base plate 1 and are adjustable only in the plane thereof. This makes clear that stabilizing elements are not tilted along with motor head 2, wherefore they are of use only for vertical cuts of the saw. However, a modified embodiment may provide stabilizing elements 38 having their ends facing each other tapered, with the saw blade being tiltable between the tips of the tapers.

According to FIG. 7, the material thickness of chip guard 47 is reduced in the working area of blade 5 by a recess 63. The guidance in base plate 1 is effected by means of lateral latches 64 extending at both sides of recess 63 and bounding guide groove 50. This embodiment is primarily intended to lower chip guard 47 relative to foot plate 10, to a position flush with contact sole 6.

Figure 13:
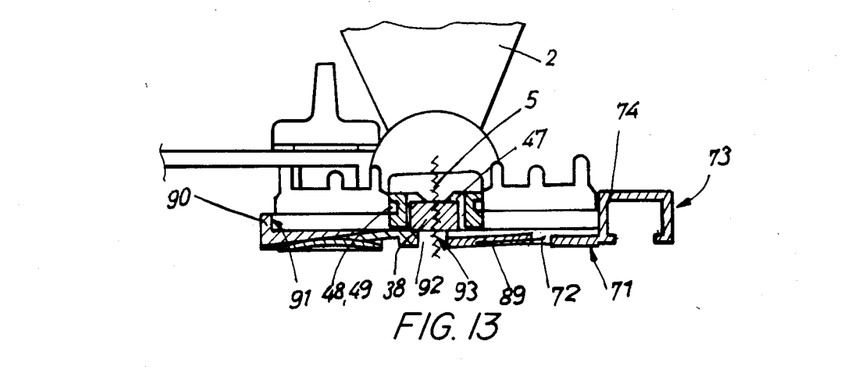
FIG. 13 is a front view corresponding to FIG. 2 of a fourth embodiment of the stabilizing elements and the splinter or chip guard, and of an alternative of the embodiment of the guide plate.
Figure 14:
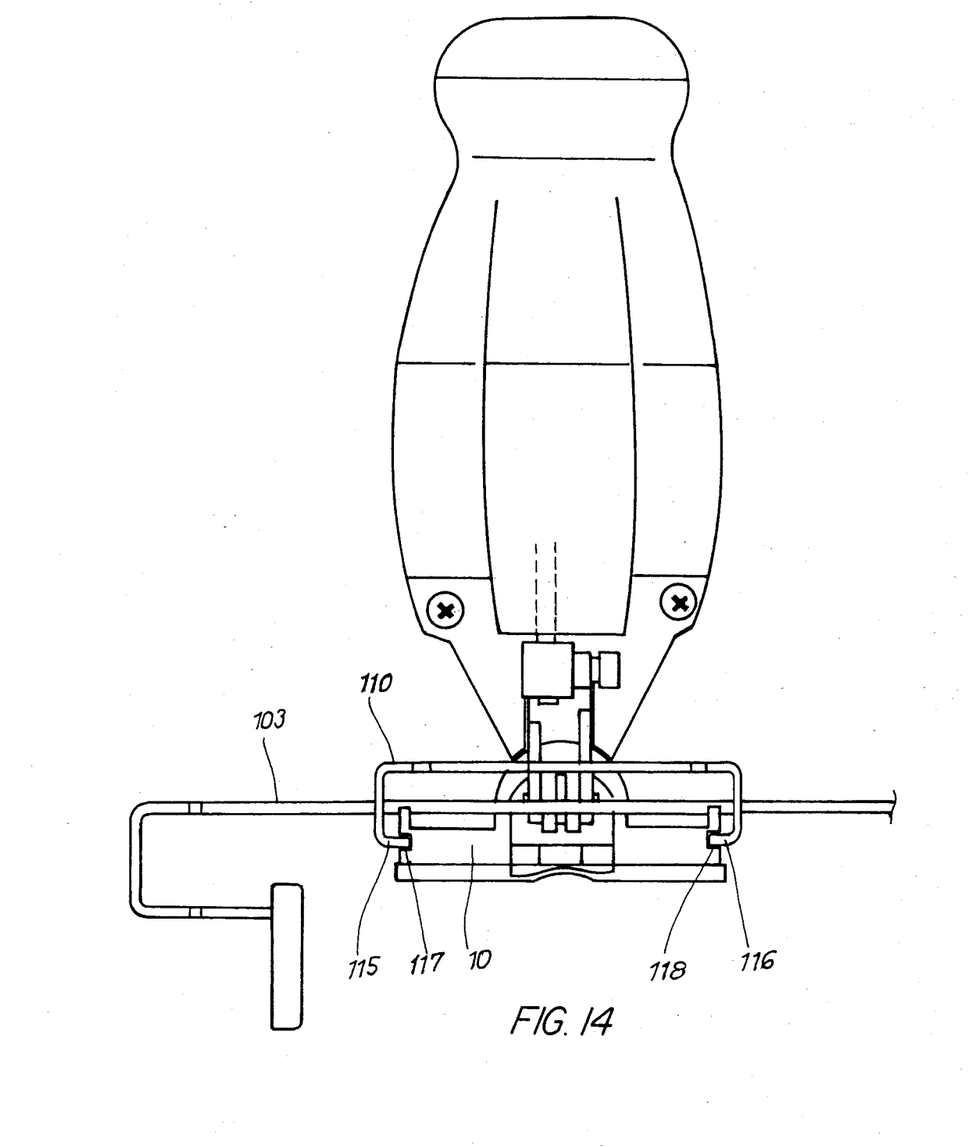
FIG. 14 is a diagrammatical showing of a modified arrangement according to FIG. 2.

Various modifications of the arrangement of stabilizing elements 38 and the chip guard 47 may be provided. FIG. 13 illustrates, for example, an embodiment in which the stabilizing elements 38 made of a ceramic material are rigidly connected to the chip guard 47. The ceramic parts are entirely or partly encapsulated in the soft material of chip guard 47, which may be done by potting. The obtained composite body is guided in clearance 14, in a similar manner as according to FIGS. 4–7.

Figure 8:
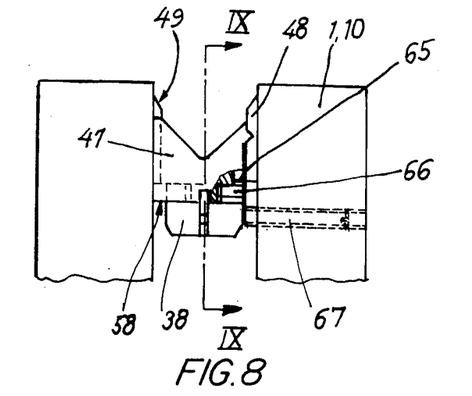
FIG. 8 is a diagrammatical top view of a second embodiment of the stabilizing elements and the chip guard.
Figure 9:
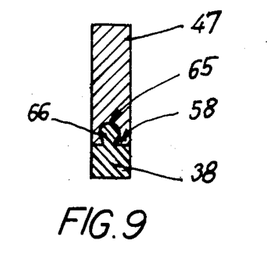
FIG. 9 is a sectional view taken along the lines IX—IX of FIG. 8
Figure 10:
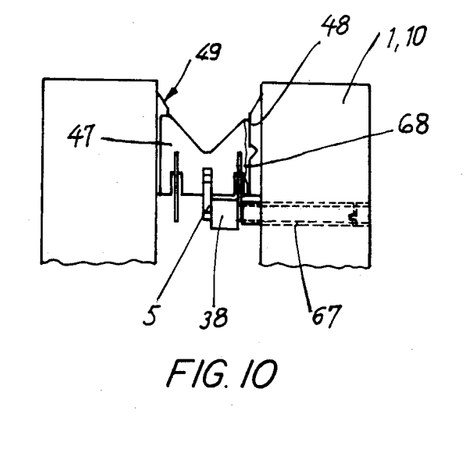
FIG. 10 is a diagrammatical top plan view of a third embodiment of the stabilizing elements and the splinter or chip guard.

Such an embodiment is very inexpensive. However, in this design, the stabilizing elements 38 cannot be adjusted. Therefore, generally, an arrangement is preferred in which the stabilizing elements are adjustable transversely to the plane of the saw blade and fixable in position, and can be guided on base plate 1 (FIGS. 4–6) as well as on chip guard 47. Examples of this latter embodiment are shown in FIGS. 8–10. Chip guard 47 is guided on base plate 1 in the nammer described above.

According to FIG. 8, chip guard 47 is provided in its rear edge facing blade 5, at each side of the longitudinal central plane, with a guide groove 65 having a rounded, T-shaped, or dovetailed cross section, for example. Guide grooves 65 are blind grooves which extend in the base plate plane transversely to the cutting direction of blade 5. The central portion of chip guard 47 between guide grooves 65 is solid, so that there the blade can cut a running gap. Blade 5 is guided between two stabilizing elements 58 which are supported by chip guard 47. The stabilizing elements protrude from the back of chip guard 47 and above and below they are flush therewith. They again are made of a ceramic material and have a guide head 66 formed thereon and matching and engaging guide groove 65. By means of this guide head 66, stabilizing elements 38 can be adjusted transversely to the saw blade plane, to be applied thereto. The necessary holding force is produced by two set screws 67 received in tapholes of base plate 1.

In the alternative of FIG. 10, stabilizing elements 38 are supported on resilient arms 58 permitting an adjustment transversley to the plane of the saw blade. Again, set screws 67 are received in base plate 1 and apply against the stabilizing elements. Resilient arms 68 are anchored in chip guard 47, more particularly embedded by their end portions in the plastic material of the guard. They might of course be secured to base plate 1.

Figure 11:
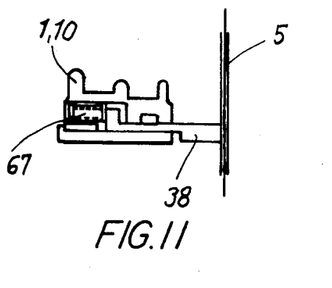
FIGS. 11 and 12, are front views corresponding to FIG. 2, of further embodiments of the stabilizing elements.
Figure 12:
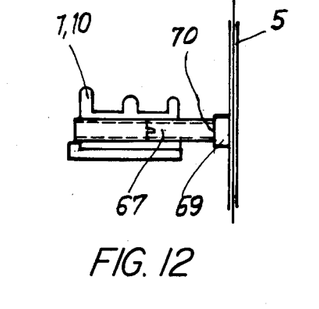

FIGS. 11 and 12 show further embodiments of stabilizing elements 38 operating on saw blade 5. According to FIG. 11, they are embodied as ceramic slides which are mounted in base plate 1 for displacement transversely to the plane of the saw blade. The slides are set against blade 5 by set screws 67. According to FIG. 12, the stabilizing element is embodied by a ceramic plate 69 which is non-detachably, rigidly connected to the front face 70 of a set screw 67, more particularly secured thereto by an adhesive. In this embodiment again, the gap between the stabilizing element and the saw blade can be adjusted by turning set screw 67.

By stabilizing saw blade 5 close above contact saw 6, the straight course of the compass saw is substantially improved. This may further be bettered by employing a thicker blade. While the conventional thickness of compass saw blades is 1.35 mm up to 2 mm, the preferred dimension being at 1.75 mm. By increasing the thickness to 1.75 mm, the stiffness in bending of blade 5 rises by 118%, and the cutting accuracy of the saw is correspondingly improved. The efficiency does slightly decrease, because of the increased cut volume, but this loss is insignificant.

Another inventive measure improving the straight cut is the provision of a guide plate to be put on the workpiece, and determining the course of the blade. Such a guide plate 71 is shown in FIG. 2. The plate comprises a supporting part including a planar portion 72 and an outwardly protruding rail 73 having two lateral guide faces 74,75. Guide plate 71 may be a metal sheet in which the rail 73 is curved out by stamping (not shown). However, plate 71 may also be made as an extruded part of light metal, for example, with rail 73 being a rectangular sectional portion thereof. Still other embodiments are certainly possible. It is advisable to provide, at least partly, an anti-skid lining 89 on the underside of guide plate 71, particularly of a plastic, to make the plate self-retaining on the workpiece.

Figure 3:
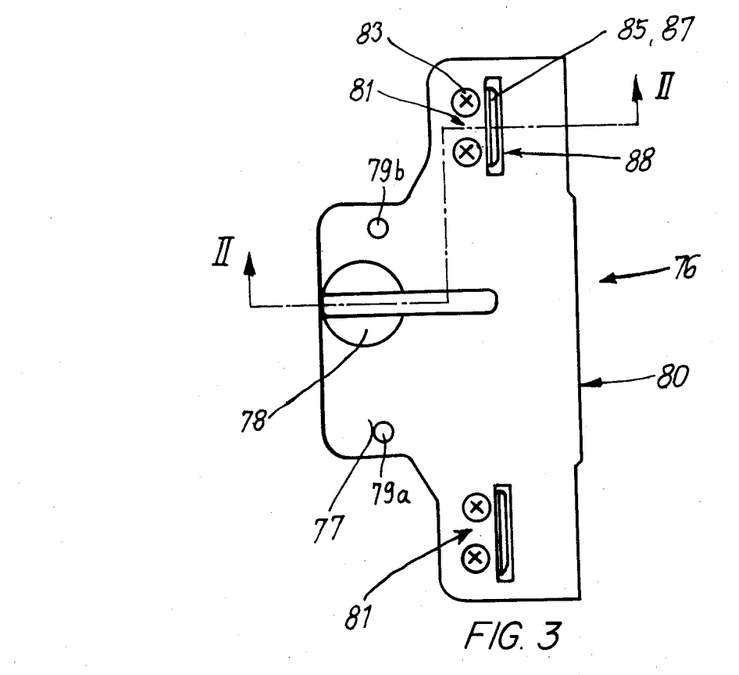
FIG. 3 is a top plan view of the intermediate piece, taken in the direction III of FIG. 2.

According to FIG. 2, guide plate 71 is connected to base plate 1 through an intermediate piece 76 shown in a top view in FIG. 3. Intermediate piece 76 is basically an L section. The protruding portion of the longer L leg 77 is to be secured to base plate 1, which may be done by means of an eccentric cam-lock. Shown is a locking handle 78 mounted for rotary motion in long L leg 77 and connected to an eccentric 79. The eccentric operates against an abutment in base plate 1 so that upon turning handle 78, leg 77 is clamped to base plate 1. Means for securing intermediate piece 76 are provided on base plate 1 at both sides of fixture 17, so that the intermediate piece can be fixed at either side of the saw. Intermediate piece 76 projects from base plate 1 laterally, with L leg 77 coming to extend above contact sole 6 at a distance such as to engage rail 73 from above. To prevent intermediate piece 76 from turning about eccentric 79, two pins 79a, 79b are provided on the intermediate piece which are engageable into bore 80a, 80b or 81a, 81b of foot plate 10.

The short L leg 80 of intermediate piece 76 is angled downwardly and in mounted position, engages one of the guide faces of rail 73. Against the opposite guide face 74 of rail 73, two set members 81 are applied which are secured from below to the long L leg 77 at lengthwise offset locations. With set members 81, a two-part guidance of intermediate piece 76 on rail 73 is obtained, with the guide plate being adjustable.

Set members 81 comprise each a slotted body 82 of plastic which is secured to long L leg 77 by fitting bolts 83. The slot in plastic body 82 is shown at 84. It extends in the longitudinal direction of rail 73 and separates in plastic body 82 a sidewall 85 which is dimensioned to be resiliently deformable. Applied against side wall 85 is a set screw 86 which is received in a taphole of plastic body 82, extends through slot 84, and can be screwed perpendicularly to rail 73. Set screw 86 presses side wall 85 against guide face 74 of rail 73. A preferably resilient metallic contact element may be provided on the surface of side wall 85 against which set screw 86 is applied.

By adjusting the deflection of side wall 85, the running play clearance of intermediate piece 76 on rail 73 is adjusted. Long L leg 77 of intermediate piece 76 is slotted at 88 in the zones of side walls 85, and the side walls have extensions 87 which engage the slots 88. These are stops limiting the deflection of side wall 85 and, at the same time, means for visually checking the adjustment in a simple way. In this way, advantageously, the two contact points of set members 81 can be adjusted relative to each other.

The eccentric clamps intermediate piece 26 at a location between the two set members 81. This area of clamping may be narrower, i.e. form a kind of a protruding lug of long L leg 77, as shown in FIG. 3.

An alternative embodiment of guide plate 71 is shown in FIG. 13. Guide plate 71 again comprises a supporting part 72 having an antiskid lining 89 on its underside. Formed on part 72 is a rail 73 having a lateral guide face 73. Rail 73 extends along one of the lengthwise sides of part 72. The opposite side of guide plate 71 is formed by an upwardly projecting flange 90 whose inside 91 forms the second guide face. Base plate 1 is introduced between rail 73 and flange 90 and placed on guide plate 71, for displacement in the lengthwise direction of the guide plate. Base plate 1 is thus framed by guide plate 71. At 92, guide plate 71 is slotted in the longitudinal direction, to permit saw blade 5 to pass through. Saw blade 5 moves close to the edge of slot 92 which, preferably, is formed by the edge of antiskid lining 89. Guide plate 71 thus can be positioned exactly, in accordance with the desired cutting line.

The combination of these provisions, namely minimizing the play, i.e. stabilizing saw blade 5 at the level of contact sole 6, using a thicker saw blade, and using a guide plate 71, results in a secure mastering of the controlled straight cut of a compass saw. As explained above, to stabilize a saw blade 5 effectively, the chip and dust removal must be controlled, which is done with the improved exhaustion. All these provisions make it possible to make in a 19 mm thick particle board a 1 meter long cut having an error in deviation in straight course and inclination of less than 0.2 mm.

Accordingly the invention provides an improved compass saw having an exhaust duct member which forms a support base permitting pivotal movement of the head portion of the saw thereon.

While specific embodiments of the invention have been shown and desribed in retail to illustrate the application of the principles of the invention, it will be understood that the invention may be embodied otherwise without departing from such principles.

What is claimed is:

1. A compass saw, comprising a motor housing head, a saw blade holder adapted to hold a saw blade mounted on said housing for up and down reciprocatable movement of the blade through a blade movement cutting plane, a drive unit connected to said blade holder for driving said blade holder, a base plate carrying said housing with said drive unit, said base plate comprising a hollow-sectioned fixture having an interior with a dust exhaust duct extending in the longitudinal direction and opening close behind the back of the saw blade to the upper side of said base plate and including an exhaust connection to which an exhaust line is connectable, said fixture being integral with said base plate, said exhaust connection including an upwardly arched upper wall having a circularly cylindrical outer surface defining a guide surface, said motor housing head being tiltably mounted on said guide surface, an opening in the base plate, and a slide overlying said opening and being movable backwardly to open a portion of the opening for controlling the exhaust capacity.

2. A compass saw according to claim 1, wherein said exhaust duct has an elliptical cross section.

3. A compass saw according to claim 1, wherein said exhaust duct has an oval cross section having a width which is larger than the height thereof.

* * * * *